United States Patent
Mehnert et al.

(10) Patent No.: US 8,283,914 B2
(45) Date of Patent: Oct. 9, 2012

(54) ABSOLUTE MAGNETIC POSITION ENCODER

(76) Inventors: Walter Mehnert, Ottobrunn (DE); Thomas Theil, Feldafing (DE)

( * ) Notice: Subject to any disclaimer, the term of this patent is extended or adjusted under 35 U.S.C. 154(b) by 360 days.

(21) Appl. No.: 12/708,275

(22) Filed: Feb. 18, 2010

(65) Prior Publication Data
US 2010/0213927 A1  Aug. 26, 2010

(30) Foreign Application Priority Data

Feb. 24, 2009 (DE) .......................... 10 2009 010 242
Jul. 25, 2009 (DE) .......................... 10 2009 034 744

(51) Int. Cl.
*G01B 7/14* (2006.01)
*G01B 7/30* (2006.01)

(52) U.S. Cl. ................................ 324/207.2; 324/207.13
(58) Field of Classification Search ............... 324/207.2, 324/207.13
See application file for complete search history.

(56) References Cited

U.S. PATENT DOCUMENTS 7,471,080 B2 * 12/2008 Sasaki et al. ............. 324/207.25
7,508,199 B2 * 3/2009 Hayashi et al. .......... 324/207.25

* cited by examiner

*Primary Examiner* — Reena Aurora
(74) *Attorney, Agent, or Firm* — Sughrue Mion, PLLC

(57) ABSTRACT

An absolute magnetic position encoder includes a magnet carrier (2) which is fixedly connected to a body to be monitored and carries permanent magnets (5) which are spaced in the direction of motion and which in paired relationship form magnet segments, by the counting and resolution of which the position of the body is determined, stationary magnetosensitive sensors (7, 8) which serve for fine resolution of the magnet segments and for recognition of the direction of motion and of which one can be supplied at least at times in cyclic relationship with a minimum current, a stationary Wiegand element (9) which when at least each second pair of magnetic poles passes delivers an electrical pulse which is added to or subtracted from a count value stored in non-volatile mode by an electronic arrangement (12), having regard to the direction of motion, and a logic circuit (26) which calculates the position of the body from the count value and the signals of the magnetosensitive sensors, wherein a part of the electrical pulse energy of the Wiegand element is stored to supply the electronic arrangement and the at least one magnetosensitive sensor with current at least upon the failure of an external power supply.

13 Claims, 4 Drawing Sheets

ABSOLUTE MAGNETIC POSITION ENCODER

Figure 1:
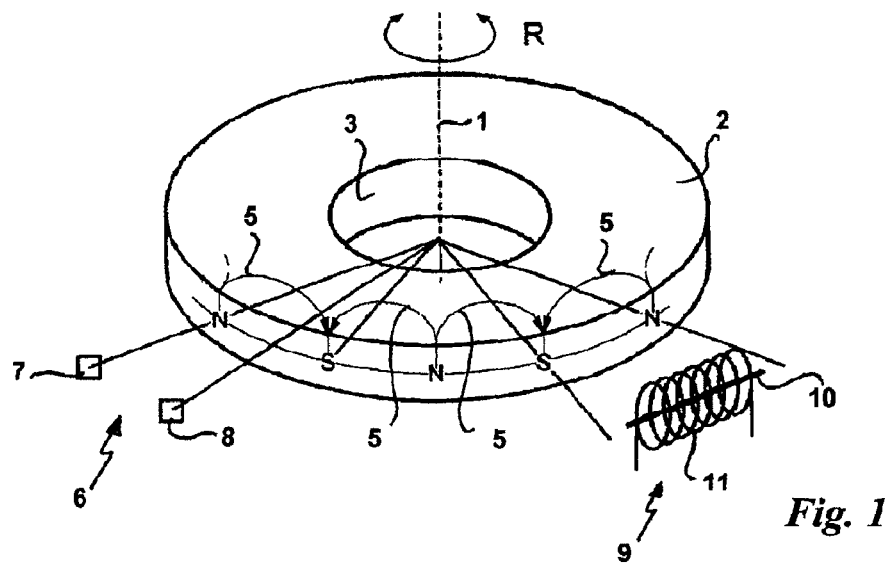

The invention concerns an absolute magnetic position encoder of the kind set forth in the classifying portion of claim 1.

Such a position encoder includes on the one hand a so-called segment counter which produces a count signal whenever the body to be monitored passes through one or more predetermined positions, the spacings of which are identified as "segments" or segment lengths. Preferably there is provided a motion direction recognition means so that the count signal can be fed with the correct sign to a counter (upward counting in one direction of motion and downward counting in the opposite direction of motion). The segment count value contained in the counter represents a rough position value for the body to be monitored.

On the other hand there is provided a fine resolution arrangement serving to produce fine position values which subdivide the segment lengths but are ambiguous insofar as they do not contain any information as to the segment to which they belong.

By means of an electronic processing system, it is possible to ascertain from the combination of the segment count value and the fine position value, a unique overall position value, the accuracy of which corresponds to that of the fine position value.

Such a position encoder is referred to as "absolute" when it is capable of continuing its above-outlined segment counting and count value storage function, even upon a complete interruption in its power supply, in particular even upon separation from a battery which is possibly present, so that upon restoration of the power supply the correct segment counter count value is immediately available even when the body to be monitored has in the meantime moved on.

To implement that for a rotary encoder in which the body to be monitored is a rotating shaft, DE 10 2008 051 479.9 which is not a prior publication describes a sensor unit for a rotary encoder which has a single-stage transmission having an input gear which is arranged concentrically relative to the rotating shaft referred to as the "drive shaft", and is non-rotatably connected thereto. A second gear engaging into the input gear serves as a magnet carrier, wherein non-rotatably mounted on the second gear for forming a segment counter is a permanent magnet having a magnetization direction extending perpendicularly to the axis of rotation of the second gear and in the field region of which there is a stationary Wiegand element which includes a Wiegand or pulse wire and an induction coil wound thereon. Whenever the permanent magnet passes through predetermined angular positions the induction coil delivers electrical pulses which are fed to a counting and storage arrangement which belongs to the electronic processing system and which counts those pulses with the correct sign (that is to say upwards upon rotation in a first direction and downwards in the opposite direction of rotation) and stores the respectively acquired count value.

In that case, as is known for example from EP 0 658 745 A2 and DE 102 59 223 A1, a part of the mechanical kinetic energy of the rotating shaft is branched off and cumulated in a magnetic intermediate storage means formed by the permanent magnet and the Wiegand or pulse wire until the above-mentioned predetermined angular position is reached. In that position the stored energy is then abruptly liberated, the magnitude thereof being so great that the electrical pulse generated by the induction coil can be used not only as a count signal but also to supply electrical energy to at least the parts of the electronic processing system which perform the counting of the count pulse, with the correct sign, and storage of the freshly produced segment count value in a non-volatile storage means, until that system has performed its tasks. The segment count value can then be interrogated upon restoration of the external power supply. That therefore ensures that the number of segments through which the body passes during a failure of the power supply is satisfactorily counted.

The term "segment counter" indicates that the sensor assembly described in DE 10 2008 051 479.9 produces a plurality of count pulses for each full revolution of the drive shaft over 360° because the second gear rotates correspondingly more frequently in accordance with the rotary speed transmission ratio m. In this case a counted "segment" can correspond either to half, a quarter or a third of a revolution and so forth of the drive shaft.

In accordance with DE 10 2008 051 479.9, for fine resolution of the individual segments, there is provided a single-turn arrangement, wherein the same permanent magnet which is also used for the segment counter can serve as the exciter of that arrangement. The associated sensor can be formed by a multi-field Hall probe which is disposed in axially directly opposite relationship with the permanent magnet and which can deliver a fine position value with a resolution of the order of magnitude of 16 bits. As this involves an instantaneous value which is independent of the past there is no need, in periods of time without an external power supply, to detect that fine position value and/or to provide for intermediate storage thereof as, after restoration of the external power supply for the Hall element arrangement, that value is immediately available again in the correct fashion.

The combination described in DE 10 2008 051 479.9 of a single-turn with a segment counter resolves the problem which is initially present when using a step-up transmission, namely identifying the segment resolved by the fine position values supplied by the single-turn (semicircle, third of a circle, quarter of a circle and so forth), because the electronic counting and evaluation system can always compute, by means of the segment count value which is ascertained by the segment counter and which is related to a known starting point, precisely which segment is being finely resolved by the single-turn.

A disadvantage with the known arrangement however is the use of a mechanical transmission which requires a certain structural size and involves the mass of at least two gears which have to be accelerated or decelerated upon changes in rotary speed.

In comparison the object of the invention is to provide a position encoder which can be both in the form of a linear encoder and also a rotary encoder, which manages with a minimum of mechanically movable components and which in that respect has all possible options and advantages which are also to be found in the combination of a single-turn and a segment counter, as described in DE 10 2008 051 479.9.

To attain that object the invention provides the features set forth in claim 1.

The term "magnetosensitive sensor elements" used hereinafter is employed to denote both Hall elements and also magnetoresistive sensor elements, in particular GMR sensor elements or however also field plates and the like. If conversely the description mentions the use of "Hall elements", that is not to be interpreted as restricting and the man skilled in the art knows that in corresponding fashion it is also possible to use all other kinds of magnetosensitive sensor elements.

The fact that the magnet carrier is directly connected to the body to be monitored in such a way that it follows or copies the motion thereof in identical fashion avoids the use of a transmission arrangement. By using at least two magnetosensitive sensor elements positioned at a spacing which extends selectively parallel or transversely and in particular perpendicularly to the direction of motion of the magnet carrier it is possible by means of the signals delivered by the magnetosensitive sensor elements to provide for fine resolution of magnetic pole segments, of which each extends from a magnetic pole of a first polarity, for example a South pole, to the next magnetic pole of the other polarity (North pole), in which respect however there still remains the uncertainty that the signals of the magnetosensitive sensor elements do not contain any information as to which magnetic pole segment is involved.

The electronic arrangement supplies that information by the count value, contained in the non-volatile storage means, of the pulses delivered by the Wiegand element. Irrespective of the speed at which the magnet carrier or the body to be monitored moves, they contain sufficient energy, even when there is not a sufficient external supply (also not by a battery or the like), to supply not only the counting and storage parts of the electronic arrangement with electrical energy sufficient for functioning thereof, but also at least one of the magnetosensitive sensor elements with a cyclic minimal charge current which admittedly does not permit fine resolution but in fact permits motion direction recognition so that counting with the correct sign can be effected.

When then the external power is available again the two magnetosensitive sensor elements are supplied with the current required for full-value fine resolution, which is substantially higher than the minimal current just mentioned, so that the instantaneous position of the body to be monitored can be determined with a high level of accuracy from the signals of the magnetosensitive sensor elements and the count value of the electronic arrangement.

It is advantageous that the counting device of the electronic arrangement can be provided without involving major complication and expenditure with a practically unlimited counting capacity so that counting and fine resolution and thus highly accurate position determination is possible over large ranges of motion, for example in relation to a rotating body over many revolutions.

Known increment encoders can only generate correct position values as long as an external supply with electrical power is ensured, for example by a battery. After an interruption in that supply they have to be returned to a known starting position so that they can again operate satisfactorily.

In contrast thereto a further important property of a position encoder according to the invention is that it is an absolute encoder which continues to operate correctly even in the absence of an external supply so that, when the power supply is restored, the correct position value is immediately delivered even when the body to be monitored has moved in one direction or the other during the failure of the supply. It is thus possible here to dispense with the return to a known position which is required in the case of incremental encoders and which is not possible in many situations of use.

As therefore the invention provides a position encoder in which, while maintaining all advantageous properties of the arrangement described in DE 10 2008 051 479.9, the mechanical transmission therein is replaced by purely magnetic/electronic components, it is also possible here to refer to an "electronic transmission".

In a preferred embodiment there can be provided a third magnetosensitive sensor element, the power supply of which is effected in cyclic fashion exclusively by electrical energy generated by the Wiegand element and the signal of which serves only for direction recognition while the signals of the other two magnetosensitive sensor elements are used for fine resolution in the periods of time in which external electrical energy is sufficiently available.

The at least two magnetosensitive sensor elements serving for fine resolution must be so arranged that at any moment they can use magnetic fields of various regions, and each of the signals delivered by them is of a periodic and steady configuration and is unique, with a sufficiently far motion of the magnet carrier. In the present context that denotes that only a single amplitude value is associated with each position value. The signals which have those properties and which are displaced relative to each other by a phase angle which can be predetermined by the choice of the mutual spatial position of the sensor elements are referred to hereinafter for brevity as "sensor signals".

By virtue of their common evaluation within each segment they make it possible to obtain a unique fine position value. There is no need for them to be sinusoidal.

A possible way of positioning the at least two magnetosensitive sensor elements, that leads to such sensor signals, provides arranging them at a mutual spacing which extends in the direction of motion and which is approximately equal to half a magnet segment length. In that case the amplitude of one of the two signals then passes approximately through its maximum while that of the other one passes through its minimum, and vice-versa. That solution is of interest in relation to sensors, the accuracy of which is not the subject of particularly high demands.

For a high level of accuracy an advantageous solution is one in which the spacings of the sensor elements in the direction of motion go towards zero or are practically equal to zero. The at least two magnetosensitive sensor elements are then arranged at a spacing which is perpendicular to the direction of motion of the magnet carrier and which therefore in the case of a rotary encoder extends radially relative to the axis of rotation, wherein generally the sensitive surfaces of the two sensor elements are mutually perpendicular. That variant affords the important advantage that the two magnetosensitive sensor elements are constantly in field regions of the same permanent magnets so that fluctuations in the magnetic field strengths, caused by changes in temperature, can also be eliminated, when ascertaining the fine position value.

A third possible option provides that for example four magnetosensitive sensor elements which are connected in paired relationship in opposition are arranged with their sensitive surfaces in a plane which is defined by the magnetization axes of the permanent magnets and the motion vector and which extends through the center of gravity of the permanent magnets, that is to say in the case of a rotary encoder in one of the radial planes in question, in such a way that the connecting lines of each pair cross over at a right angle, wherein the one of those connecting lines extends parallel to the direction of motion, that is to say tangentially in the case of a rotary encoder. Here, magnetic field deflection by a ferromagnetic plate is required, as is known for example from Hall probes, which are offered by Melexis under the designations MLX 90316 (with digital output) or 2 SA-10 (with analog output).

These and further advantageous configurations of a position encoder according to the invention are set forth in the appendant claims.

Figure 2:
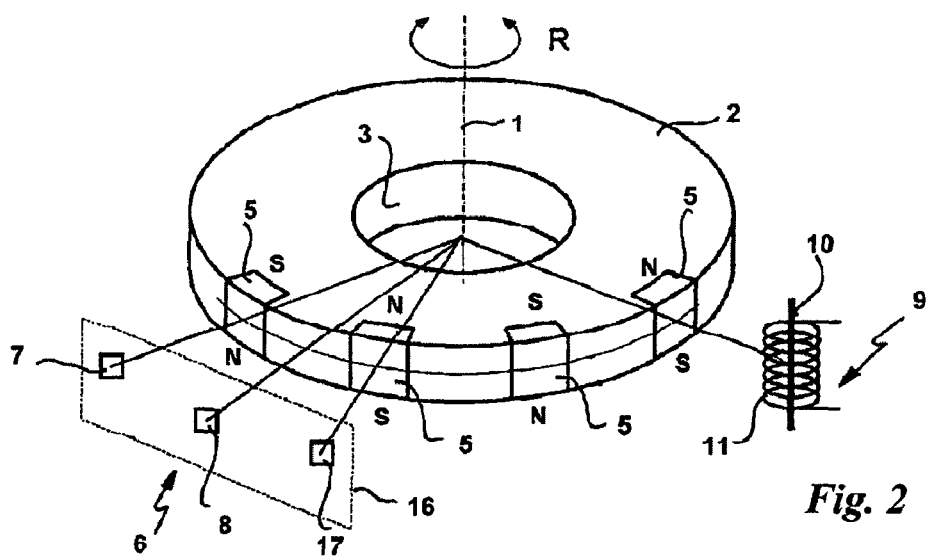
Figure 3:
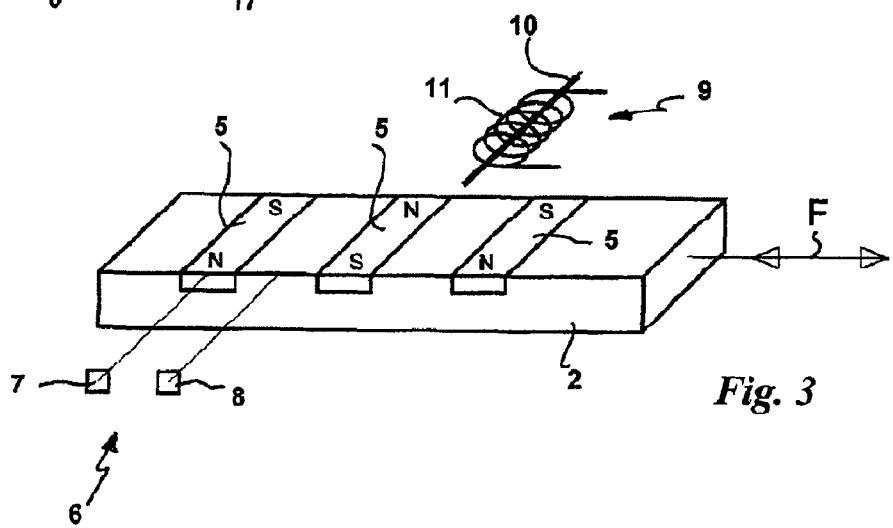
Figure 4:
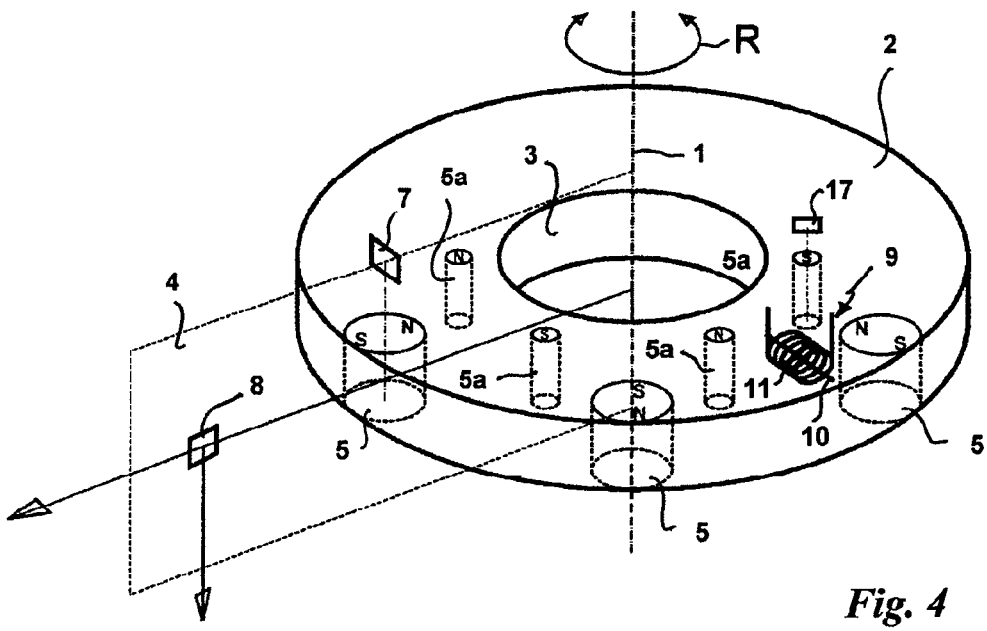
Figure 5:
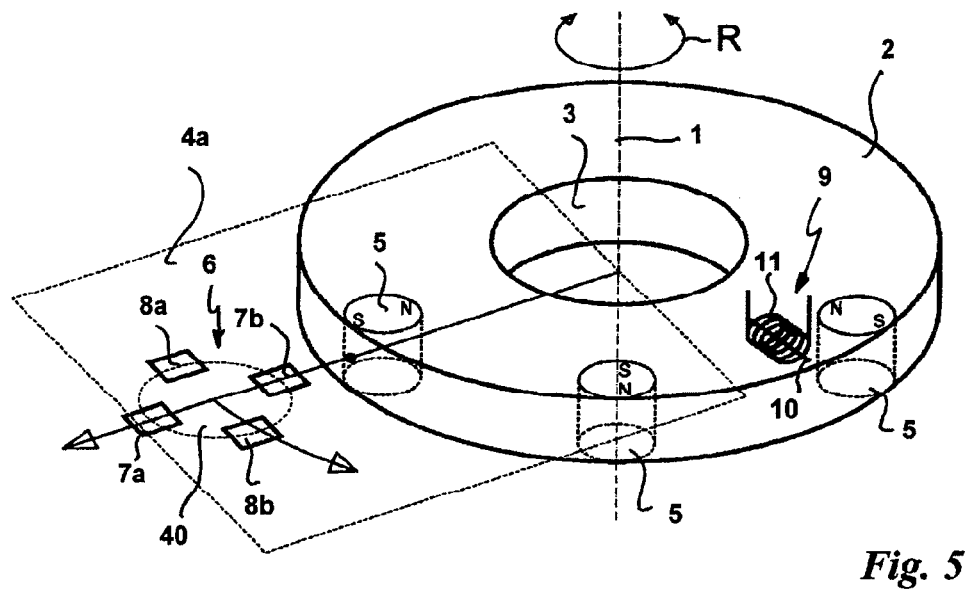
Figure 6:
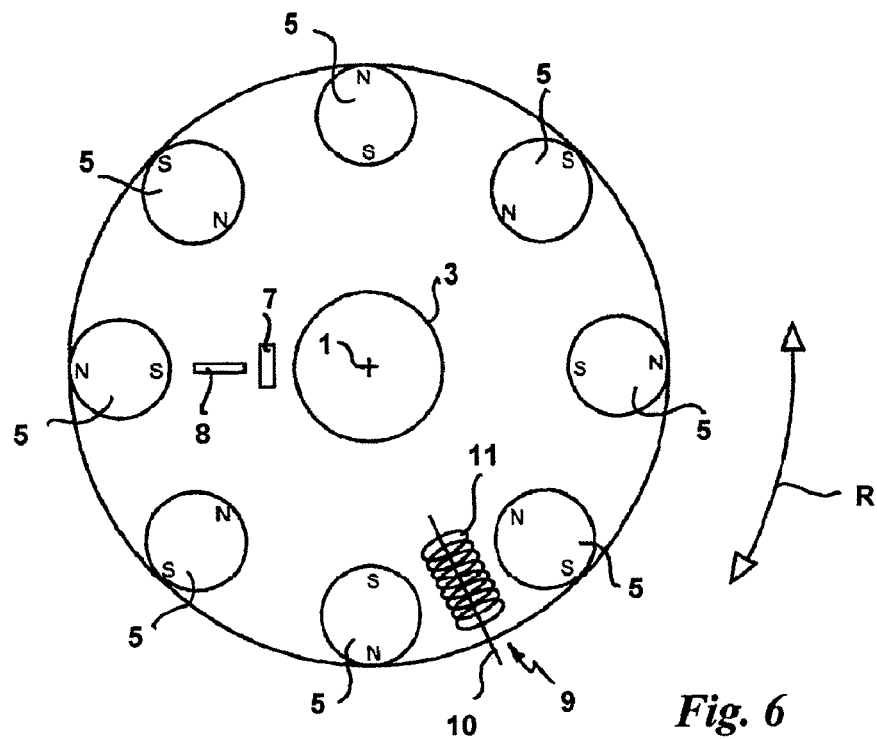
Figure 7:
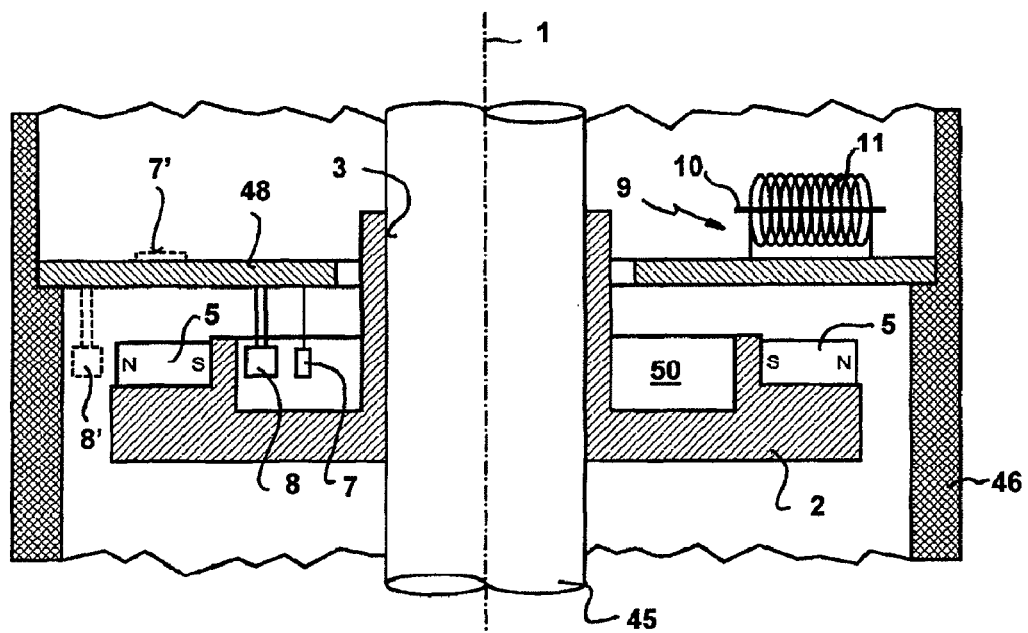
Figure 8:
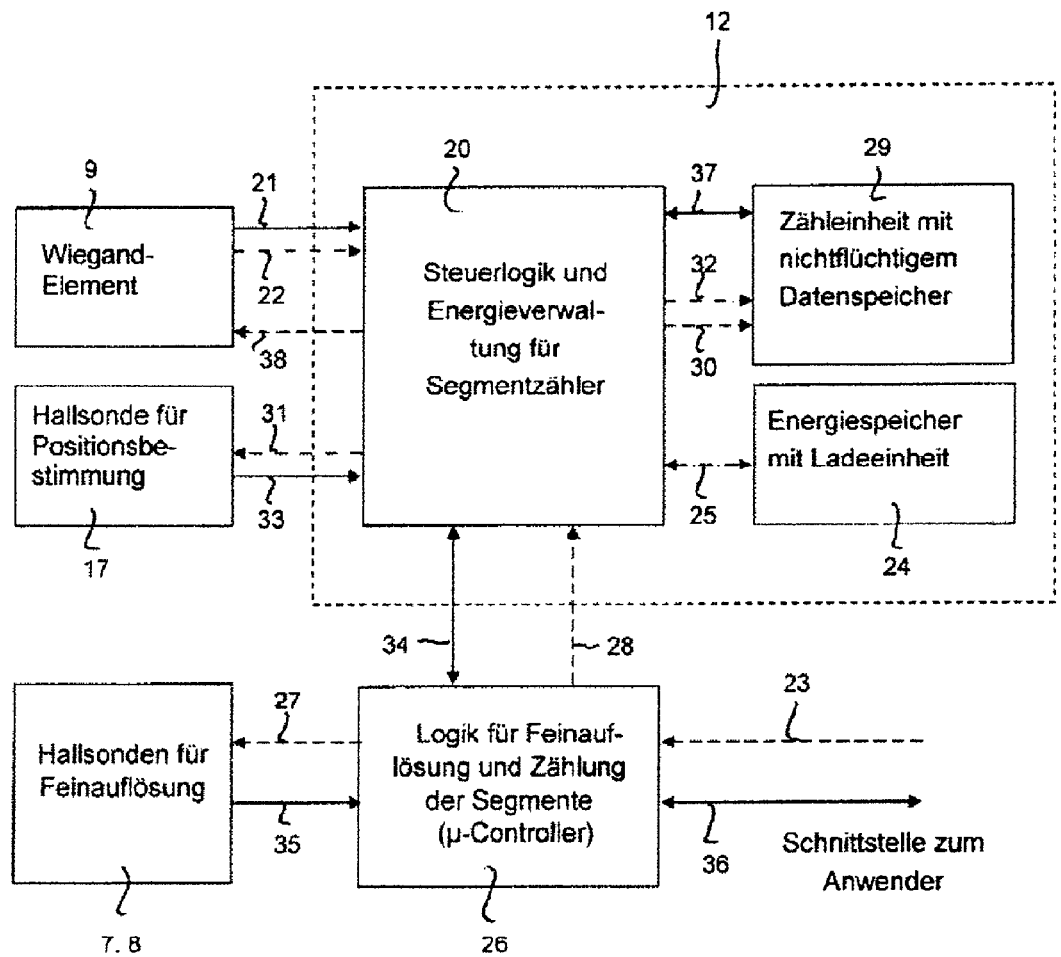

The invention is described hereinafter by means of embodiments by way of example with reference to the drawing in which:

FIG. 1 shows a highly diagrammatic perspective view of the most essential functional parts of a position encoder according to the invention in the form of a rotary encoder, having a magnet carrier which comprises a magnetizable material and in which the permanent magnets are directly provided, FIG. 2 shows a view corresponding to FIG. 1 of the most essential functional parts of a position encoder according to the invention in the form of a rotary encoder comprising a magnet carrier comprising a non-magnetizable material in which a multiplicity of permanent magnets are embedded, FIG. 3 shows a highly diagrammatic perspective view of the most essential functional parts of a position encoder according to the invention in the form of a linear encoder having a magnet carrier comprising a non-magnetizable material in which a multiplicity of permanent magnets are embedded, FIG. 4 shows a view corresponding to FIG. 1 of the most essential functional parts of a further embodiment of a position encoder according to the invention in the form of a rotary encoder, having magnetosensitive sensor elements which are arranged in an axial plane extending through the axis of rotation and the spacing of which in the direction of motion is practically equal to zero, and an additional group of permanent magnets which supply signals permitting recognition of the direction of rotation of the magnet carrier, FIG. 5 shows a view corresponding to FIG. 1 of the most essential functional parts of a third embodiment of a position encoder according to the invention in the form of a rotary encoder and which includes magnetosensitive sensor elements arranged in a single plane perpendicular to the axis of rotation, that is to say a radial plane, FIG. 6 shows a diagrammatic plan view of the most essential functional parts of a fourth embodiment of a position encoder according to the invention in the form of a rotary encoder, FIG. 7 shows a diagrammatic section through a rotary encoder according to the invention similar to the rotary encoder of FIG. 6, and FIG. 8 shows a simplified block circuit diagram of an electronic arrangement for receiving, processing and forwarding the signals delivered by the Wiegand element and the arrangement of the magnetosensitive sensor elements.

In all the Figures of drawings parts which are identical or equivalent to each other are denoted by the same references.

In FIGS. 1 and 2 the respective body, the motion of which is to be detected in a measuring procedure, is a shaft 45 which is here only indicated by its axis of rotation 1 and which is only shown in FIG. 7 and which can rotate both in the clockwise direction and also in the opposite direction, as indicated by the double-headed arrow R. A magnet carrier 2 which in the form of an annular disk is arranged concentrically with respect to the shaft 45 and is non-rotatably connected thereto so that it copies the rotary motion thereof, that is to say it rotates therewith at an identical angular speed. For that purpose the magnet carrier 2 has a central bore 3 which extends therethrough and which serves to receive the shaft 45 to be monitored, which is fixed in the bore 3 after being inserted therein. That magnet carrier 2 is thus suitable for a hollow shaft arrangement.

In the case shown in FIG. 1 the magnet carrier 2 is formed by a disk which either consists entirely of a magnetizable material or on the peripheral region of which is provided a magnetizable material, for example in the form of a magnet strip. It is essential that a multiplicity of permanent magnets 5 are so provided that their pole directions extend tangentially relative to the axis of rotation 1 of the shaft 45. In this case the arrangement of those permanent magnets 5 is such that magnetic North and South poles N and S respectively appear alternately on the outer peripheral surface of the annular disk forming the magnet carrier 2, each of the poles with each of its neighbors forming a respective pair of magnetic poles, each of which corresponds to a magnet segment. The magnet segments, that is to say the spacings of the mutually adjacent magnetic poles in the peripheral direction are equal in size (within the limits of manufacturing tolerances) and respectively form a n-th part of $2\pi$ if it is assumed that the magnet carrier 2 has a total of n magnetic poles. In other words: if the angle that two radial lines extending through adjacent magnetic poles include with each other is denoted by $\phi$ then the following applies:

$$n\hat{\phi}=2\pi$$

A sensor arrangement 6 comprising at least two magnetosensitive sensor elements, in particular Hall elements 7, 8, and a Wiegand element 9 are respectively stationarily arranged in the peripheral region of the magnet carrier 2 at a small radial spacing therefrom. In that respect, in the direction of rotation of the magnet carrier 2, the spacing of the two Hall elements 7, 8 is equal to half the magnetic pole spacing or half a magnet segment so that, when the signal generated by the one of the Hall elements 7, 8 is considered as a rough approximation as a sine signal, the other can be viewed as a corresponding cosine signal; each of those two sensor signals has a period length of $2\phi$ over two magnet segments.

A full revolution of the shaft 45 over $2\pi$ is resolved by the described arrangement therefore as n times fine, corresponding to the effect of a mechanical transmission in which the shaft is connected to a large gear which drives a smaller gear which rotates n times more quickly and which in turn carries a permanent magnet, the field of which passes through a stationary 4-quadrant Hall probe, as is described in DE 10 2008 051 479.9. The arrangement according to the invention can therefore be viewed as an "electronic transmission" as it replaces a mechanical transmission.

The Wiegand element 9 which for example can comprise a Wiegand or a pulse wire 10 with wound-on induction coil 11 is oriented tangentially relative to the magnet carrier 2 and serves to eliminate the uncertainty, caused by the use of n magnetic poles, of the instantaneously generated fine position value as it delivers a count signal when moving past at least each one second magnetic pole. In that case the signal of one of the two Hall elements 7, 8 is used for direction recognition, as is known in principle from the state of the art. Thus, a continuous segment count value can be formed in the associated electronic arrangement 12 which is shown more precisely in FIG. 8, wherein, depending on the respective direction of rotation of the shaft 45, the new pulse from the Wiegand element 9 is either added to the existing count value or is deducted therefrom. For each respective full revolution of the shaft 45 over $2\pi$ generally n such count values occur, which as such already represent a rough "fine resolution" of that full revolution, which then becomes highly fine resolution by virtue of the additional fine resolution by means of the signals from the Hall elements 7, 8.

As it does not represent any problem for the electronic counter for detecting the pulses delivered by the Wiegand element 9 to be provided with a counting capacity of any desired size, counting the revolutions of the shaft 45 can also be effected over an unlimited number of full revolutions so that this involves a true absolute multiturn.

The energy content of the pulses delivered by the Wiegand element 9 is in a first approximation independent of the speed of the magnet carrier 2 moving therepast, that is to say here it is independent of the rotary speed and it is always sufficient not only to count those pulses but also to feed a considerable part of the energy contained therein into an energy storage means 24 (see FIG. 8) which, when no electrical external power supply is present, supplies at least one of the Hall elements 7, 8 in cyclic fashion with a minimal charging current sufficient for direction recognition, and the counting unit 29 which serves for counting with the correct sign and storage of the freshly acquired segment count value with a non-volatile data storage means (FIG. 8) with sufficient electrical energy to ensure the functions thereof.

The embodiment shown in FIG. 2 differs from that shown in FIG. 1 firstly in that the magnet carrier 2 comprises a non-magnetizable material, for example plastic material, brass, aluminum or the like, in which bar-shaped permanent magnets 5 are embedded for example by the material being injection molded therearound, in such a way that their pole directions extend parallel to axis of rotation 1 of the shaft 45 and that respective magnetic North and South poles N and S appear alternately at the upper and lower end faces 14, 15 respectively of the annular disk-shaped magnet carrier 2, the poles being disposed in the immediate proximity of the peripheral surface 3. The foregoing description in relation to the embodiment of FIG. 1 in terms of the pole spacings and the lengths thereof equally applies here.

In principle that also applies to the mode of operation of the overall arrangement as here two Hall elements 7, 8 and a Wiegand element 9 are also arranged in the region of the magnetic fields of the permanent magnets 5. While the Hall elements 7, 8 in this example also involve a spacing extending in the tangential direction with respect to the magnet carrier 2, equal to half the spacing between mutually adjacent magnetic poles, the Wiegand or pulse wire 10 of the Wiegand element 9 is oriented parallel to the axis of rotation 1.

The sensor arrangement 6 which can also be in the form of an integrated chip, as is indicated by the broken line 16, includes here an additional magnetosensitive sensor element which is also formed for example by a Hall element 17 and which serves here for recognition of the direction of rotation while the other two Hall elements 7, 8 serve exclusively for fine resolution of the magnet segments. In this case the additional Hall element 17 is always supplied in cyclic fashion with electrical energy originating from counting pulses of the Wiegand element 9. The lengths in respect of time of the current pulses fed to the Hall element 17 can be very short, that is to say they can be formed by just so many electrical charges that troublefree detection of the Hall element signal produced thereby is possible. The cyclically controlled actuation of the Hall element 17 is effected both when there is an external power supply and also when it has failed.

If classic Hall elements 7, 8 and 17 are used then they are so arranged that the normals of their magnetic field-sensitive surfaces extend parallel to the magnetic field lines which thus pass perpendicularly through those surfaces. When using Hall probes with magnetic field deflection structures which, as mentioned, are offered for example by Melexis, the magnetic field-sensitive surfaces can also be so arranged that their normals are perpendicular to the magnetic field lines extending outside the deflection structures.

If both sensor signals are to be obtained with a 4-quadrant Hall probe combined with a field line deflection structure, the magnetic field-sensitive surfaces must be disposed in the surface defined by the magnetization axes of the permanent magnets 5 and the direction of motion, therefore in the example in FIG. 2 on a cylindrical surface concentric with the axis of rotation 1, in which case the connecting line of the one pair of mutually oppositely connected magnetic field-sensitive surfaces faces in the direction of motion and that of the other pair is perpendicular thereto.

The function of fine resolution of the magnet segments is furthermore performed by the Hall elements 7, 8 which, in the periods of time in which there is an external power supply, are permanent supplied with a current which permits accurate fine resolution corresponding to the demands involved.

The use described herein of three Hall elements 7, 8 and 17 can also be effected in the same manner as in the FIG. 1 embodiment. Also when, as shown therein, there are only two Hall elements 7 and 8, they can be provided on a single integrated chip.

FIG. 3 shows a cubic magnet carrier 2 which can move reciprocatingly in the direction of the double-headed arrow F over a predetermined stroke length jointly with a body (not shown) to be monitored, which can involve for example a machine slide. That magnet carrier 2 again comprises a non-magnetizable material, for example plastic material, in which a multiplicity of permanent magnets 5 are embedded, for example by the material being injection molded therearound, in such a way that they are exposed at the surface of the magnet carrier, that is upward in FIG. 3, and extend approximately perpendicularly to the direction of motion F. Admittedly, FIG. 3 only shows three permanent magnets 5, but if required there may also be substantially more such permanent magnets which can also be so arranged that North and South poles alternate with each other in the direction of motion F.

Disposed laterally beside the magnet carrier 2 in the region of the magnetic fields of the permanent magnets 5 there are again two Hall elements 7, 8 at a spacing which extends in the direction of motion F and which is equal to half a magnet segment. In this case also the arrangement may have a third Hall element, as was described with reference to FIG. 2. In principle it is also possible for the Hall elements to be arranged above the upper surface of the magnet carrier 2. The foregoing description relating to the orientation of the normals to the magnetic field-sensitive surfaces of Hall elements correspondingly applies. In this case also it is possible to arrange a 4-quadrant Hall probe with ferromagnetic magnetic field deflection plates in the plane of motion extending through the centers of gravity of the permanent magnets 5.

A Wiegand element 9 which again comprises a Wiegand or a pulse wire 10 with an induction coil 11 wound thereon extends here just above the upper flat side of the magnet carrier 2 approximately perpendicularly to the direction of motion F so that in the normal case, when each permanent magnet 5 moves therepast due to the motion involved, it delivers a counting pulse which can be used in the same manner both for determining position and also for power supply for at least a part of the electronic arrangement 12 shown in FIG. 8 and one of the Hall elements 7, 8 or 17, as was described hereinbefore.

The Wiegand element is to be so arranged that the respectively cyclically controlled Hall element is in the "field of vision" of a magnet when the Wiegand element is triggered. Normally that is 30° when the segment length is 180°.

The respective position of the magnet carrier 2 and therewith also of the body (not shown) to be monitored, which is fixedly connected thereto, is thus uniquely represented at each moment in time at which the full external power supply is ensured, by the Hall element signals which provide for fine resolution of the respective magnet segments and the count value which characterizes the magnet segment in question and which arises out of counting with the correct sign (upward or downward depending on the respective direction of motion) of the pulses of the Wiegand element 9. In the absence of an external electrical power supply counting of the magnet segments also continues here, as described above for the rotary encoders, and when that power supply is restored the fine resolution signals are also immediately available again.

The magnet carrier 2 shown in FIG. 4 has a multiplicity of cylindrical, diametrally magnetized permanent magnets 5 which are arranged at equal angular spacings about its periphery in such a way that their magnetic axes, that is to say the connecting lines of their respective North and South poles, extend radially, wherein in the case of adjacent permanent magnets 5, there is always a South pole, then a North pole and then again a South pole etc. alternately disposed outwardly. Of those permanent magnets, for the sake of simplicity FIG. 4 only shows three although there are actually eight such permanent magnets, with the illustrated angular spacings. A Wiegand element 9 is positioned above the path of motion of those permanent magnets 5 in such a way that the Wiegand wire extends radially relative to the axis of rotation 1. As in the above-described embodiments the Wiegand element 9 produces a counting and power supply signal at least when at least each second permanent magnet 5 passes through a predeterminable position.

In order to recognize the direction in which the magnet carrier 2 rotates, that is to say whether a currently produced counting signal is to be added to or subtracted from an existing count value, the magnet carrier 2 includes here a number, corresponding to the number of permanent magnets 5, of bar-shaped auxiliary permanent magnets 5a which are arranged distributed on a smaller radius than the permanent magnets 5 at equal angular spacings in such a way that their magnetic axes extend parallel to the axis of rotation 1 and an upwardly disposed North pole alternately follows each upwardly disposed South pole and vice-versa. Disposed over the upper flat side of the annular magnet carrier 2 is a stationary magnetosensitive sensor element 17, for example a Hall element, disposed in such an angular position with respect to the Wiegand element 9 that, depending on the polarity of the auxiliary permanent magnet 5a passing through beneath it, it produces a signal in good time when it produces a counting and power pulse, which signal, depending on its respective sign, causes addition or subtraction of the new counting pulse to or from the existing count value. That therefore permits correct counting function by those auxiliary permanent magnets 5a.

In comparison fine resolution of the individual segments is effected by means of the magnetic pole pairs formed by the permanent magnets 5 and the Hall elements 7 and 8 which here are so arranged that the centroids of their sensitive surfaces lie in an axial plane 4 passing through the axis of rotation 1. Thus the spacing of those two sensor elements in the direction of motion is practically equal to zero. The Hall probe 7 is disposed over the path of motion of the permanent magnets 5 and is so arranged that the normal to its sensitive surface extends in a radial direction. It therefore detects substantially the individual magnetic fields respectively extending between the North and South poles of one and the same permanent magnet 5 and delivers a signal of maximum amplitude precisely when one of those permanent magnets 5 is passing through below it, in which case the sign of that signal is given by the orientation of the permanent magnet 5 in question. If two mutually adjacent permanent magnets 5 are of approximately the same magnetic strength, then their fields cancel each other substantially in the center between them so that here the output signal of the Hall probe 7 exhibits a zero-crossing. The equidistant arrangement of the permanent magnets 5 thus results in a periodic signal which in the ideal case is sinusoidal.

In comparison the Hall probe 8 is disposed in the center of the axial heights of the permanent magnets 5 radially outside the peripheral surface of the magnet carrier 2 and is so oriented that the normal to its sensitive surface extends tangentially relative to the direction of rotation R, that is to say perpendicularly to the plane 4. It detects the magnetic fields extending between the permanent magnets 5 in the peripheral direction and its output signal, approximately in the center between two adjacent permanent magnets 5, involves a maximum amplitude, the sign of which again depends on the polarity of the pair of permanent magnets in question. If one of the permanent magnets 5 is disposed with its magnetic axis on the same radius as the sensitive surface of the Hall probe 8, then its output signal presents a zero-crossing. That output signal is therefore also periodic and is sinusoidal only in the ideal case (which does not occur in practice), but it has a phase displacement in relation to the output signal of the Hall probe 7 so that a unique fine position value resolving the segment in question can be ascertained. An advantage of this embodiment is that both Hall elements detect the magnetic field regions of the same permanent magnets at any moment in time so that, with suitable signal processing, temperature-induced fluctuations in the magnetic field strength are not involved in ascertaining the fine position value.

In the embodiment shown in FIG. 5 the permanent magnets 5 of the magnet carrier 2 and the Wiegand element 9 are arranged in the same manner as in the FIG. 4 embodiment. The auxiliary permanent magnets 5a are not required here because the sensor arrangement 6, in cooperation with the permanent magnets 5 also performs the function of producing a signal characterizing the direction of rotation, as was already described with reference to the FIG. 1 example.

The sensor arrangement 6 includes here four Hall elements 7a, 7b and 8a, 8b which are connected in opposite paired relationship and the sensitive surfaces of which are all disposed in one and the same radial plane 4a which here extends at half the axial height of the permanent magnets 5 parallel to the upward and downward end faces of the magnet carrier 2. The Hall elements of each pair 7a and 7b, 8a and 8b respectively are at a mutual spacing and the (notional) connecting lines of their centroids are perpendicular to each other, the connecting line of the pair 7a, 7b extending in the radial direction relative to the axis of rotation 1 and the connecting line of the pair 8a, 8b extending in the tangential direction. Each of the four Hall elements 7a, 7b and 8a, 8b is partially covered by a ferromagnetic field deflection plate 40. In this case also, upon a motion of the magnet carrier 2, periodic sensor signals which are phase-shifted relative to each other are produced, which permit unique fine position value determination. Because the four Hall elements 7a, 7b and 8a, 8b are preferably disposed in the form of a very small sensor arrangement on a common chip it is possible to say here that their spacings are practically equal to zero in the direction of motion and also perpendicularly thereto.

FIG. 6 shows a plan view of a magnet carrier 2 which, as regards the permanent magnets 5, is constructed precisely like the magnet carrier 2 in FIG. 4. The auxiliary permanent magnets 5a are not required here because the rotation direction recognition signal is again produced by one of the two Hall elements 7 or 8 in conjunction with the permanent magnets 5.

The Wiegand element 9 is in this case also disposed above the path of motion of the permanent magnets 5.

A further difference in relation to the FIG. 4 example is that the Hall element 8 is admittedly disposed on the same axial surface as the Hall element 7 but not outside but within the circle formed by the permanent magnets 5 and both Hall elements 7, 8 are arranged on the same radial line. The orientation of the sensitive surfaces of the Hall elements 7, 8 and their function is the same as described with reference to FIG. 4.

The sectional view in FIG. 7 shows a rotary encoder according to the invention comprising a stationary substantially cylindrical housing 46 through which extends the shaft 45 to be monitored. Pushed thereonto is a magnet carrier 2 of the kind shown in FIG. 6, which is at least non-rotatably connected to the shaft 45. Of its eight permanent magnets 5 FIG. 7 shows two mutually diametrally opposite ones, the North poles of which face radially outwardly and the South poles of which face radially inwardly while the poles of their adjacent magnets (not shown in FIG. 7) are oriented in precisely opposite relationship (but see FIG. 6!).

Extending above the magnet carrier 2 transversely through the housing 46 is a circuit board 48 which is fixed thereto and which on its upper side carries the Wiegand element 9 and in diametrally opposite relationship thereto on its underside the two Hall elements 7 and 8 which are both disposed within the circular path along which the permanent magnets 5 move on the same axial height as the centers of gravity of the permanent magnets 5. To permit that, an annular axial recess 50 is provided in the upper surface of the magnet carrier 2. The active surfaces of the two Hall elements 7 and 8 are at a right angle to each other.

The Hall elements 7' and 8' shown in broken lines are not present at the same time as the Hall elements 7 and 8 but only show alternative positioning options. It is to be noted in this respect that the Hall element 7' must again be provided with a magnetic field deflection structure in order to be able to function in the illustrated position with its downwardly facing sensitive surface.

The electronic arrangement 12 which is shown in FIG. 8 and which in the illustrated embodiment is supplemented by an energy storage means 24 with charging unit is suitable for use with a measurement arrangement as is shown in FIGS. 2 and 4, that is to say it includes three Hall elements 7, 8 and 17. Of the connecting lines illustrated by arrowed lines, which interconnect the various blocks in FIG. 8, the connecting lines shown by solid lines serve for pure signal or information transmission while the dashed lines serve for the external power supply and the dash-dotted lines serve for the internal energy supply.

The pulses which the Wiegand element 9 transmits to the central control logic and energy management 20 contain both an information component (line 21) and also a power component (line 22) which are passed by way of the control logic and energy management 20 on the line 25 to an energy storage means 24 which is provided in this variant and which is for example in the form of a capacitor, and is stored there by means of a charging unit.

The external power supplied by way of the line 23 serves in normal operation not only for the energy supply to the logic 26 for fine resolution and counting of the signals (p-controller) but also the Hall elements 7, 8 for fine resolution (line 27), the control logic and energy management 20 (line 28) and the counting unit 29 with non-volatile storage means (line 30) while the Hall element 17 for determining the position, even when the external power is applied, is supplied not with same but with the power which originates from the Wiegand element 9 and which is fed by way of the control logic 20 on the lines 25 and 31 from the energy storage means 24 (line 31).

If the external power supply fails then both a part of the control logic and energy management 20 (line 25) and also the counting unit 29 are supplied with power coming from the Wiegand element 9 from the energy storage means 24 (line 32) to ensure troublefree functioning thereof.

A separate energy storage means is not required when all processes needed for counting and storage can take place within the time duration of each of the energy pulses supplied by the Wiegand element.

As already mentioned the Wiegand element 9 supplies its signal pulses by way of the line 21 while the Hall element 17 transmits its position determining signals by way of the line 33 to the control logic and energy management 20. The latter is in data exchange relationship with the logic 26 for fine resolution and counting of the signals by way of the bidirectional line 34, receiving the fine resolution signal of the Hall elements 7, 8 by way of the line 35, and communicates by way of the bidirectional line 36 with the user of the data supplied by the position detector. Data exchange between the control logic and energy management 20 and the counting unit 29 is effected by way of the bidirectional line 37.

The line 38 serves to be able to supply current to the Wiegand element 9 for synchronization of the segment counter with the fine resolution when the arrangement is brought into operation by means of the external power, without being reliant on a pulse triggered by a movement of the magnet carrier 2.

It should be pointed out that any of the usual Hall elements illustrated without a magnetic field deflection plate can also be used with such a deflection structure, whereby the orientation of the active, that is to say magnetic field-sensitive surface changes through 90°. As a result the position of installation of the Hall elements also possibly changes. In the same manner the illustrated deflection structures can also be omitted if suitable orientation adaptation is effected.

The invention claimed is:

1. An absolute magnetic position encoder for the measurement of linear or rotary motions of a body, characterized in that it includes the following:
   a magnet carrier (2) which is fixedly connected to the body and has a plurality of magnetic pole pairs which are formed by permanent magnets (5) and which are arranged in the direction of motion and whose alternately successive North and South poles form magnet segments, by the counting and resolution of which the position of the body is determined,
   a stationary sensor element arrangement (6) which for fine resolution of the magnet segments and for recognition of the direction of motion of the magnet carrier (2) includes at least two magnetosensitive sensor elements (7, 8) which use various magnetic field regions and of which at least one can be supplied at least at times with a low minimum current,
   a stationarily arranged Wiegand element (9) which is triggered at least by each second magnetic pole pair for the delivery of an electrical pulse, and
   an electronic arrangement (12) which includes a control logic and energy management circuit (20) and a counting unit (29) with a non-volatile storage means and which having regard to a signal delivered by the sensor element arrangement (6) and characterizing the direction of motion of the magnet carrier (2), adds the electrical pulses of the Wiegand element (9) to a count value stored in the non-volatile storage means or subtracts them therefrom, and
   a logic circuit (26) which is in data exchange relationship with the electronic arrangement (12) and which from the acquired count value and having regard to the signals delivered by the sensor element arrangement (6) calculates the instantaneous absolute position of the body, wherein a substantial part of the electrical power which is contained in the pulses delivered by the Wiegand element (9) serves at least in those periods of time in which an external power supply is absent for the power supply for the electronic arrangement (12) and for supplying the at least one magnetosensitive sensor (7, 8, 17) with the low minimum current so that the pulses of the Wiegand element (9) can also be counted and processed in that operating condition.

2. A position encoder as set forth in claim 1 characterized in that the electronic arrangement (12) includes an energy storage means (24) with charging unit, which can be charged up by the pulses delivered by the Wiegand element (9).

3. A position encoder as set forth in claim 1 characterized in that the two magnetosensitive sensor elements (7, 8) serving for fine resolution of the segments are at a spacing in the direction of motion.

4. A position encoder as set forth in claim 3 characterized in that the spacing of the magnetosensitive sensor elements (7, 8) in the direction of motion is less than or equal to half a magnet segment length.

5. A position encoder as set forth in claim 3 characterized in that the spacing of the magnetosensitive sensor elements (7, 8) in the direction of motion is equal to zero.

6. A position encoder as set forth in claim 1 characterized in that the two magnetosensitive sensor elements (7, 8) serving for fine resolution of the segments are at a spacing perpendicularly to the direction of motion.

7. A position encoder as set forth in claim 6 characterized in that the spacing of the magnetosensitive sensor elements (7, 8) in the direction of motion is equal to zero.

8. A position encoder as set forth in claim 1 characterized in that when using a four-quadrant Hall probe in which each pair of oppositely connected magnetic field-sensitive surfaces (7a, 7b; 8a, 8b) is at a spacing the spacing of the one pair (7a, 7b) in the direction of motion and the spacing of the other pair (8a, 8b) perpendicularly to the direction of motion is equal to zero.

9. A position encoder as set forth in claim 1 characterized in that the magnetic pole pairs formed by two associated different magnetic poles respectively extend in parallel relationship with the direction of motion.

10. A position encoder as set forth in claim 1 characterized in that the magnetic pole pairs formed by two associated different magnetic poles respectively extend in perpendicular relationship with the direction of motion.

11. A position encoder as set forth in claim 1 characterized in that the Wiegand element (9) extends in the direction of the pairs of magnetic poles.

12. A position encoder as set forth in claim 1 characterized in that each of the pairs of magnetic poles is implemented by a diametrally magnetized, disk-shaped permanent magnet (5).

13. A position encoder as set forth in claim 1 characterized in that each of the pairs of magnetic poles is implemented by an axially magnetized bar-shaped permanent magnet (5).

* * * * *